US008139732B2

(12) United States Patent
Latter et al.

(10) Patent No.: US 8,139,732 B2
(45) Date of Patent: *Mar. 20, 2012

(54) METHOD AND SYSTEM FOR PROVIDING ENHANCED CALLER IDENTIFICATION

(75) Inventors: Teresa Farias Latter, Kildeer, IL (US); Nancy Ann Book, Naperville, IL (US); Mary Louise Hardzinski, Palatine, IL (US); James Thomas Maciejewski, Spring Grove, IL (US); John Wesley Moss, Lake Zurich, IL (US); Thomas Joseph McBlain, Arlington Heights, IL (US); Steven Darrell Benfield, Raleigh, NC (US); Robin Denise Brady, Purcellville, VA (US); Walden Blaine Crabtree, Jr., Raleigh, NC (US); Tracy Lynn Kato, Raleigh, NC (US); Brian Scott Utesch, Raleigh, NC (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1363 days.

This patent is subject to a terminal disclaimer.

(21) Appl. No.: 11/789,658

(22) Filed: Apr. 25, 2007

(65) Prior Publication Data
US 2007/0201638 A1 Aug. 30, 2007

Related U.S. Application Data

(63) Continuation of application No. 09/684,828, filed on Oct. 10, 2000, now Pat. No. 7,227,931, which is a continuation of application No. 09/122,165, filed on Jul. 24, 1998, now Pat. No. 6,178,232.

(51) Int. Cl.
*H04M 1/64* (2006.01)
*H04M 15/06* (2006.01)

(52) U.S. Cl. ........... 379/88.21; 379/88.03; 379/88.22; 379/133; 379/142.01; 379/142.1; 455/403; 455/412.2

(58) Field of Classification Search ............ 379/67.1, 379/88.21, 142.01, 142.06, 142.1, 88.03, 379/88.22, 133, 142.04, 142.07, 211.02; 455/403, 412.2
See application file for complete search history.

(56) References Cited

U.S. PATENT DOCUMENTS

| | | | |
|---|---|---|---|
| 4,878,240 A * | 10/1989 | Lin et al. | 379/88.22 |
| 4,899,358 A | 2/1990 | Blakley | |
| 5,033,076 A | 7/1991 | Jones et al. | |
| 5,311,572 A * | 5/1994 | Friedes et al. | 379/211.02 |
| 5,341,414 A | 8/1994 | Popke | |
| 5,432,837 A * | 7/1995 | Engelke et al. | 379/52 |
| 5,479,489 A * | 12/1995 | O'Brien | 379/88.03 |

(Continued)

OTHER PUBLICATIONS

Mason, C. 'Wireless Carriers Add New Services to their Bag of Tricks', May 16, 1994, Telephony, ISSN: 00402656, vol. 226, Iss. 20, p. 7.

(Continued)

*Primary Examiner* — Gerald Gauthier
(74) *Attorney, Agent, or Firm* — Cantor Colburn LLP

(57) ABSTRACT

Systems and methods for providing enhanced caller identification screening using audible caller name announcement are disclosed. Generally, a request for audible caller identification associated with a calling communication station is transmitted to the calling communication station based on an analysis of a query comprising data indicating whether presentation of standard call identification information to a called communication station. Audible caller identification information is then received and transmitted to the called communication station.

15 Claims, 7 Drawing Sheets

U.S. PATENT DOCUMENTS

| | | | |
|---|---|---|---|
| 5,497,414 A | 3/1996 | Bartholomew | |
| 5,511,111 A | 4/1996 | Serbetcioglu et al. | |
| 5,513,247 A * | 4/1996 | Mukerjee et al. | 455/403 |
| 5,521,969 A | 5/1996 | Paulus et al. | |
| 5,526,406 A | 6/1996 | Luneau | |
| 5,533,106 A | 7/1996 | Blumhardt | |
| 5,548,636 A | 8/1996 | Bannister et al. | |
| 5,590,184 A | 12/1996 | London | |
| 5,594,784 A | 1/1997 | Velius | |
| 5,604,792 A | 2/1997 | Solomon et al. | |
| 5,668,862 A | 9/1997 | Bannister et al. | |
| 5,729,592 A | 3/1998 | Frech et al. | |
| 5,796,806 A | 8/1998 | Birckbichler | |
| 5,802,148 A | 9/1998 | Sixer, II | |
| 5,848,142 A | 12/1998 | Yaker | |
| 5,850,435 A | 12/1998 | Devillier | |
| 5,864,612 A * | 1/1999 | Strauss et al. | 379/142.03 |
| 5,905,774 A | 5/1999 | Tatchell et al. | |
| 5,978,671 A * | 11/1999 | Foladare et al. | 455/412.2 |
| 5,999,599 A | 12/1999 | Shaffer et al. | |
| 6,178,232 B1 | 1/2001 | Latter et al. | |
| 6,252,953 B1 | 6/2001 | Gruchala et al. | |
| 6,332,021 B2 | 12/2001 | Latter et al. | |
| 6,498,841 B2 | 12/2002 | Bull et al. | |
| 6,633,634 B1 | 10/2003 | Crockett et al. | |
| 6,744,866 B1 * | 6/2004 | Nolting et al. | 379/133 |
| 7,227,931 B1 * | 6/2007 | Latter et al. | 379/88.21 |
| 7,286,657 B2 * | 10/2007 | Latter et al. | 379/142.01 |
| 7,302,049 B2 * | 11/2007 | Latter et al. | 379/142.01 |
| 2001/0012348 A1 * | 8/2001 | Latter et al. | 379/142.06 |
| 2001/0016036 A1 * | 8/2001 | Latter et al. | 379/142.1 |
| 2002/0041664 A1 * | 4/2002 | Latter et al. | 379/142.01 |
| 2002/0064265 A1 * | 5/2002 | Latter et al. | 379/142.01 |
| 2004/0005043 A1 * | 1/2004 | Latter et al. | 379/142.01 |
| 2004/0109550 A1 * | 6/2004 | Latter et al. | 379/142.01 |
| 2005/0185785 A1 * | 8/2005 | Latter et al. | 379/211.02 |
| 2007/0201638 A1 * | 8/2007 | Latter et al. | 379/88.21 |

OTHER PUBLICATIONS

Ghosal, A. 'An Application of IN Technology for 800 MHz PCS', 1994, Universal Personal Communications, ISBN: 0-7803-1823-4, Record 3rd Ann. Intl. Conf. pp. 624-628.

McDonald, M. 'ClassCo bows Cidney caller ID', Dec. 9, 1996, Twice, ISSN: 08927278, vol. 11, Iss. 23, p. 24.

* cited by examiner

METHOD AND SYSTEM FOR PROVIDING ENHANCED CALLER IDENTIFICATION

RELATED APPLICATIONS

The present patent document is a continuation of U.S. patent application Ser. No. 09/684,828, filed Oct. 10, 2000, now U.S. Pat. No. 7,227,931 which is a continuation of U.S. patent application Ser. No. 09/122,165 (now U.S. Pat. No. 6,178,232), filed Jul. 24, 1998, the entirety of both of which are hereby incorporated by reference.

BACKGROUND

The present invention relates generally to telecommunications services and more particularly to caller identification.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One common occurrence that decreases the effectiveness of Caller ID systems is the inability of a service provider to provide the standard Caller ID information for a particular incoming call. A service provider may not be able to provide the standard Caller ID information if the Caller ID information is blocked by the calling party, or if the Caller ID information is unavailable or incomplete. When the standard Caller ID information cannot be provided, the called party is not adequately informed about who is calling and cannot determine whether or not to accept the incoming call before answering the call. Because the effectiveness of Caller ID systems is greatly reduced when information cannot be provided, an improved system and method for providing caller identification information that overcome these deficiencies are needed.

DETAILED DESCRIPTION OF THE DRAWINGS

By way of introduction, the preferred embodiments described below include a method and system for providing a called party with audible caller identification information when standard caller identification information cannot be provided. In one embodiment, calls for which standard caller identification information is blocked, unavailable or incomplete are prevented from being connected to the called party. Instead of connecting the calls, a request for audible caller identification information is transmitted to the calling party. If the calling party provides the requested audible caller identification information, the audible information is transmitted to the called party. Caller identification information can thus be provided to the called party when standard caller identification information cannot be provided.

Figure 1:
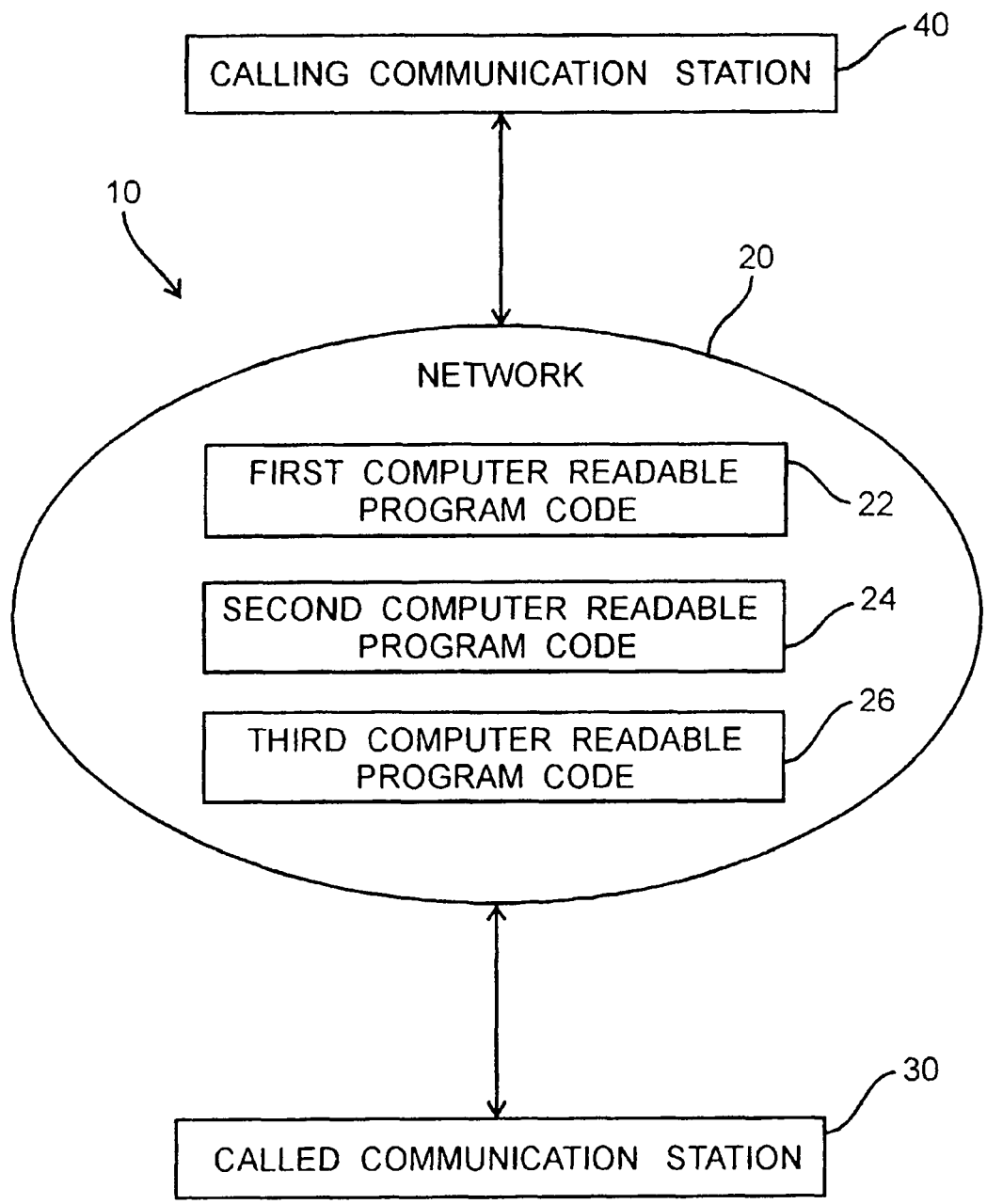
FIG. 1 is a block diagram of a telecommunications system of a preferred embodiment.

By way of example, FIG. 1 depicts a system 10 of a preferred embodiment. The system 10 comprises a network 20, a called communication station 30 coupled with the network 20 and a calling communication station 40 coupled with the network 20. The term "coupled with," as used herein, means directly coupled with or indirectly coupled with through one or more components. The network 20 preferably comprises computer usable medium having first, second and third computer readable program codes 22, 24, 26 embodied therein. It is important to note that while the program codes 22, 24, 26 have been shown as three separate elements, their functionality can be combined and/or distributed. It is also important to note that "medium" is intended to broadly include any suitable medium including analog or digital, hardware or software, now in use or developed in the future.

The system 10 is preferably implemented in a telecommunications network as known to those skilled in the art. Alternatively, the system 10 can be implemented in a computer network or any other network that is adapted to transmit, store and retrieve information. The calling communication station 40 and the called communication station 30 preferably comprise analog telephone stations as known to those skilled in the art. According to an alternative embodiment, the communication stations 30, 40 can comprise any suitable communication station adapted for use in the present embodiments as known to those skilled in the art.

Figure 2:
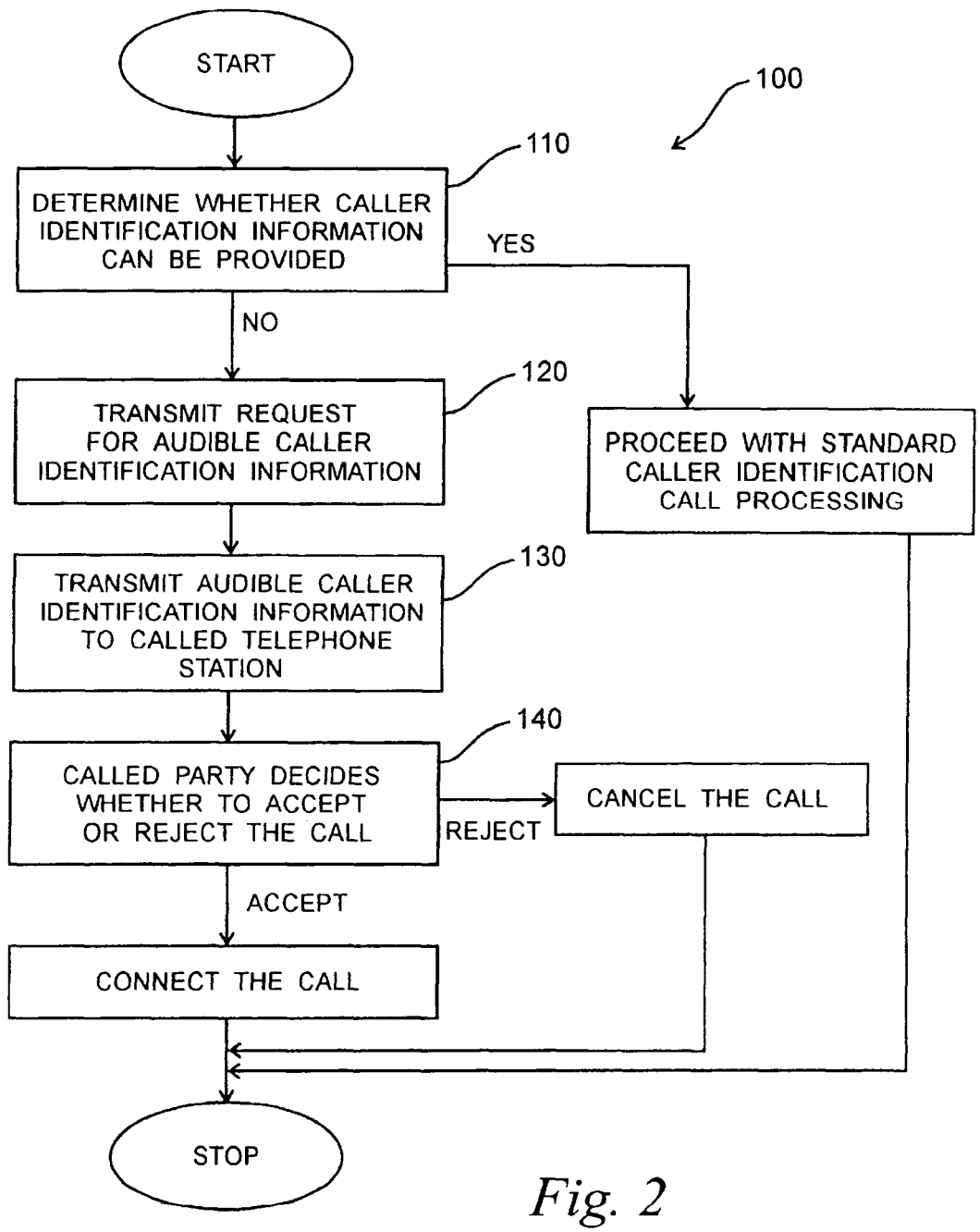
FIG. 2 is a flow chart of a method of a preferred embodiment for providing enhanced caller identification.

The system 10 of FIG. 1 can be used to implement the method 100 depicted in FIG. 2. When the calling party at the calling communication station 40 places a call to a called party at the called communication station 30, the first computer readable program code 22 determines whether standard caller identification information associated with the calling communication station 40 can be provided to the called communication station 30 (step 110, FIG. 2). As used herein, the term standard caller identification (Caller ID) information means the information associated with a calling communication station that is typically stored in a database and automatically retrieved and provided to a called party as known to those skilled in the art. If it is determined that standard caller identification information cannot be provided, the second computer readable program code 24 transmits a request for audible caller identification information to the calling communication station 40 (step 120). As used herein, the term audible caller identification information means audible information provided by the calling party in response to a request for such information. If the calling party provides the requested audible caller identification information, the third computer readable program code 26 transmits the audible caller identification information to the called communication station 30 (step 130). After receiving the audible caller identification information, the called party can decide whether to proceed with the call or cancel the call (step 140).

Figure 3:
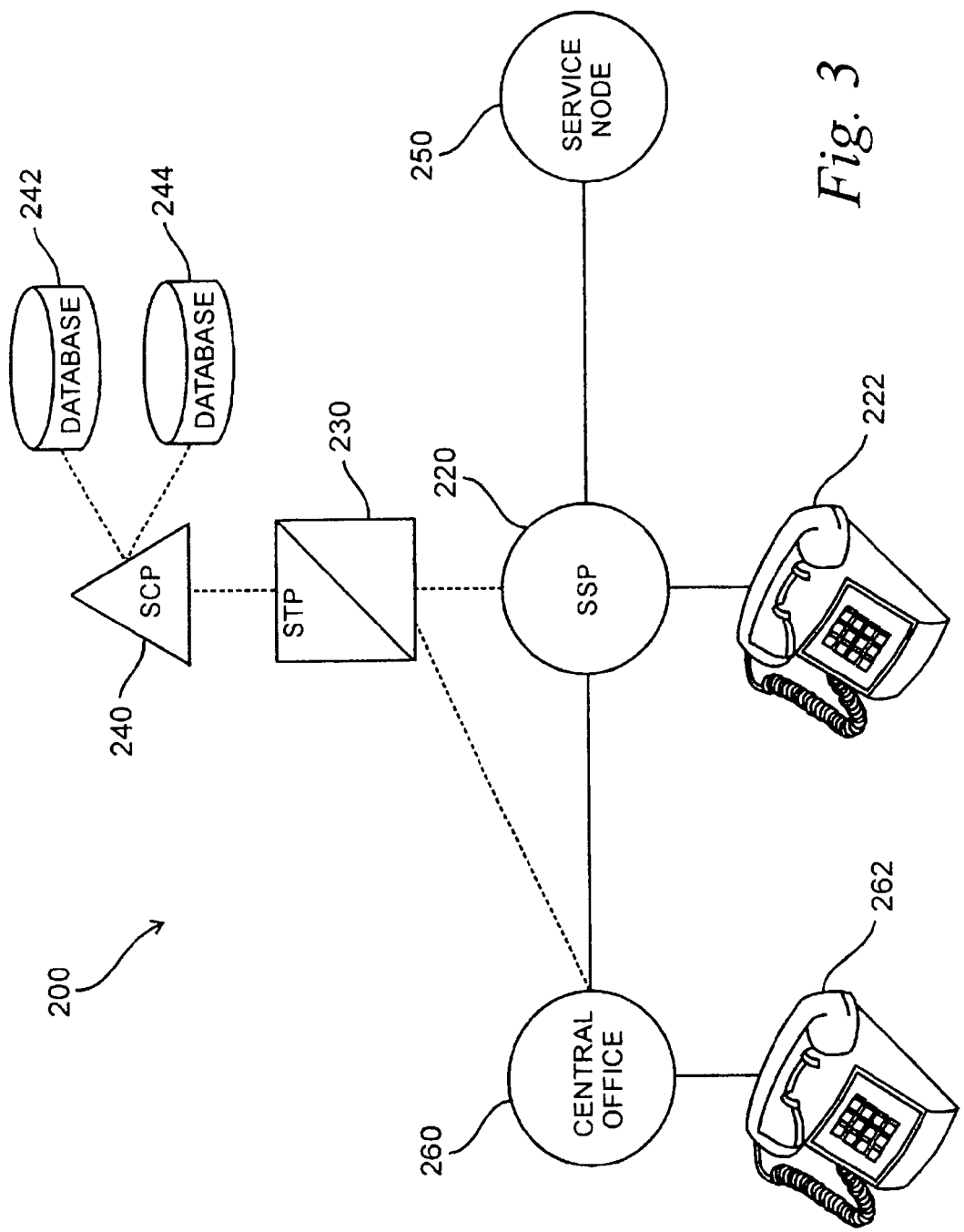
FIG. 3 is a block diagram of a first preferred embodiment of the telecommunications system of FIG. 1.

By way of further example, FIG. 3 depicts a preferred embodiment of the system 10 described above. The system 200 comprises a service switching point (SSP) 220, a signal transfer point (STP) 230, a service control point (SCP) 240, a first SCP database 242, a second SCP database 244, a service node (SN) 250, a central office 260, called telephone station 222 and calling telephone station 262. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 220 preferably comprises an AIN switch that routes calls, recognizes and responds to triggers, generates queries to obtain call information and responds to returned call information. SSP 220 connects called telephone station 222 with central office 260 to enable a calls to be placed between called telephone station 222 and calling telephone station 262. SSP 220 preferably communicates with SCP 240, central office 260 and SN 250 by utilizing a signaling protocol such as Signaling System 7 (SS7) or other such signaling protocols as presently known to those skilled in the art or developed in the future. SSP 220 preferably generates queries to SCP 240 and receives and responds to responses to the queries returned from SCP 240.

STP 230 preferably comprises a network element that transfers signaling communications in response to signaling protocols such as SS7 or other such signaling protocols as presently known to those skilled in the art or developed in the future. STP 230 preferably transfers queries from SSP 220 to SCP 240 and transfers responses to the queries from SCP 240 to SSP 220.

SCP 240 preferably comprises an AIN element that stores call information and receives and responds to queries. SCP 240 preferably stores call control information in the first SCP database 242 and can access the stored call control information. SCP 240 also stores standard caller identification information in the second SCP database 244 and can access the stored caller identification information. SCP 240 receives queries generated by SSP 220 and preferably responds to the queries by performing database searches to locate the requested call control information or caller identification information as known to those skilled in the art. SCP 240 can forward the call control information or caller identification information to SSP 220.

SN 250 preferably comprises a network element that enables communications between telephone stations 222, 262 and the network. SN 250 can preferably transmit messages to and receive responses from telephone stations 222, 262. SN 250 can generate announcements that can be transmitted to telephone stations 222, 262. SN 250 can transmit responses such as audible caller identification information from telephone station 262 to telephone station 222 by connecting telephone stations 222, 262 or by recording and playing back the responses ask known to those skilled in the art. SN 250 can preferably receive and respond to input transmitted from telephone station 222. The term input means a suitable signal such as DTMF tones as known to those skilled in the art.

Database 242 preferably comprises a data storage element for use with SCP 240 as known to those skilled in the art. Database 242 preferably stores call control information that can be implemented by SSP 220 to control calls. Such call control information is known to those skilled in the art.

Database 244 preferably comprises a standard caller identification with name database as known to those skilled in the art. Database 244 preferably includes the name of the person associated with calling telephone station 262 along with the telephone number that is associated with calling telephone station 262. Database 244 can alternatively comprise a caller assistance database as known to those skilled in the art. While databases 242, 244 are depicted within a telecommunications system, databases 242, 244 can comprise any suitable databases containing information adapted for use in the present embodiment and are not limited to databases located within a telecommunications network. It is also important to note that while databases 242, 244 are shown as separate components, they can be implemented as a single database.

Central office 260 preferably comprises an AIN network switch as known to those skilled in the art. Central office 260 enables calls to be placed between calling telephone station 262 and called telephone station 222. Alternatively, central office 260 can comprise a non-AIN network switch as known to those skilled in the art.

Telephone stations 222, 262 preferably comprise analog telephone sets as known to those skilled in the art. Alternatively, telephone stations 222, 262 can comprise wireless, PCS, ISDN or any other form of communication station known to those skilled in the art.

Figure 4:
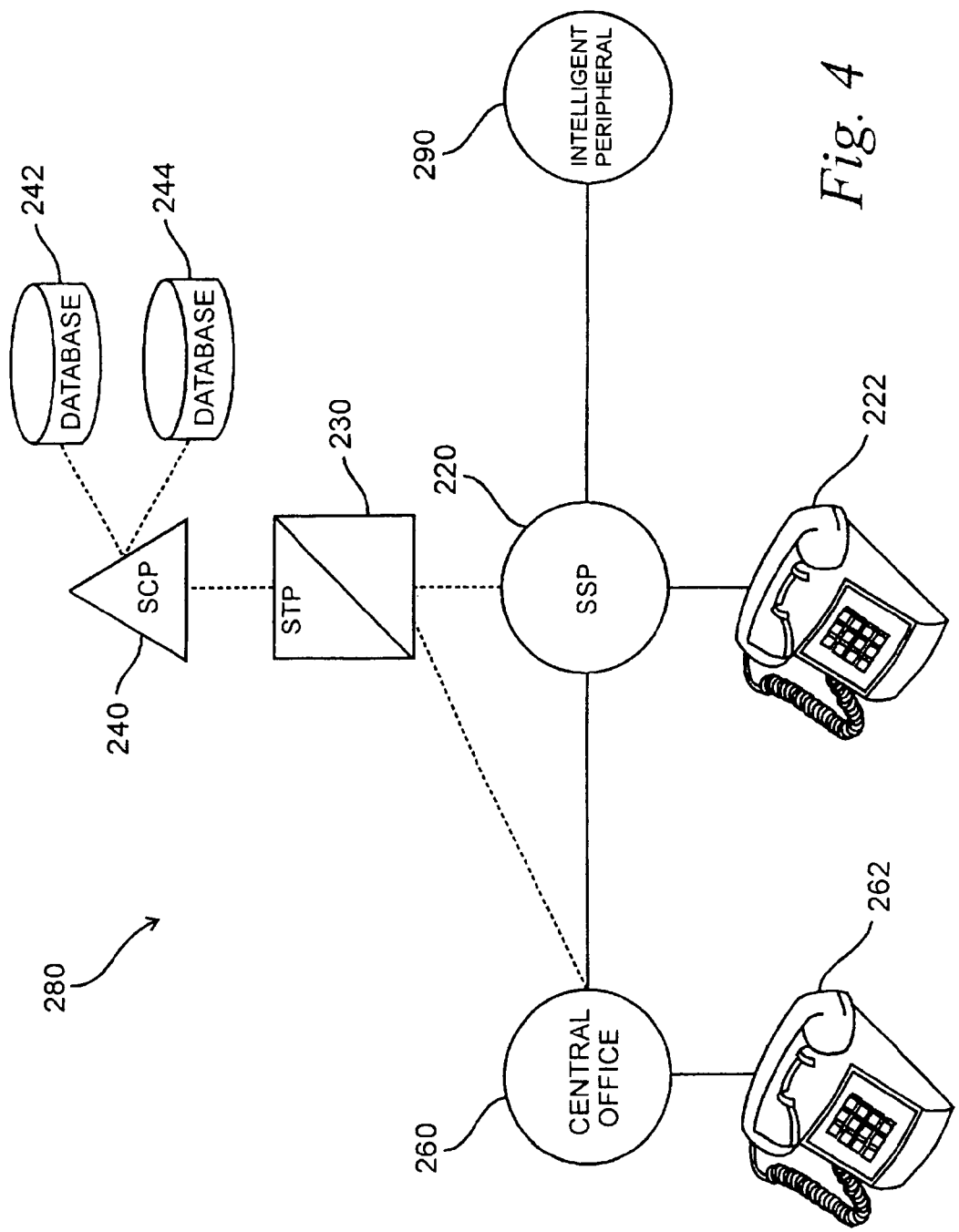
FIG. 4. is a block diagram of a second preferred embodiment of the telecommunications system of FIG. 1.

Referring now to FIG. 4, an alternate embodiment of the system of FIG. 3 is shown. The system 280 comprises an SSP 220; a called telephone station 222; an STP 230, an SCP 240; a first SCP database 242, a second SCP database 244, a central office 260 and a calling telephone station 262, all as described above in reference to FIG. 3. The system 280 also includes an intelligent peripheral (IP) 290 that communicates with SSP 220 and performs the same functions as SN 250 as described herein.

Figure 5:
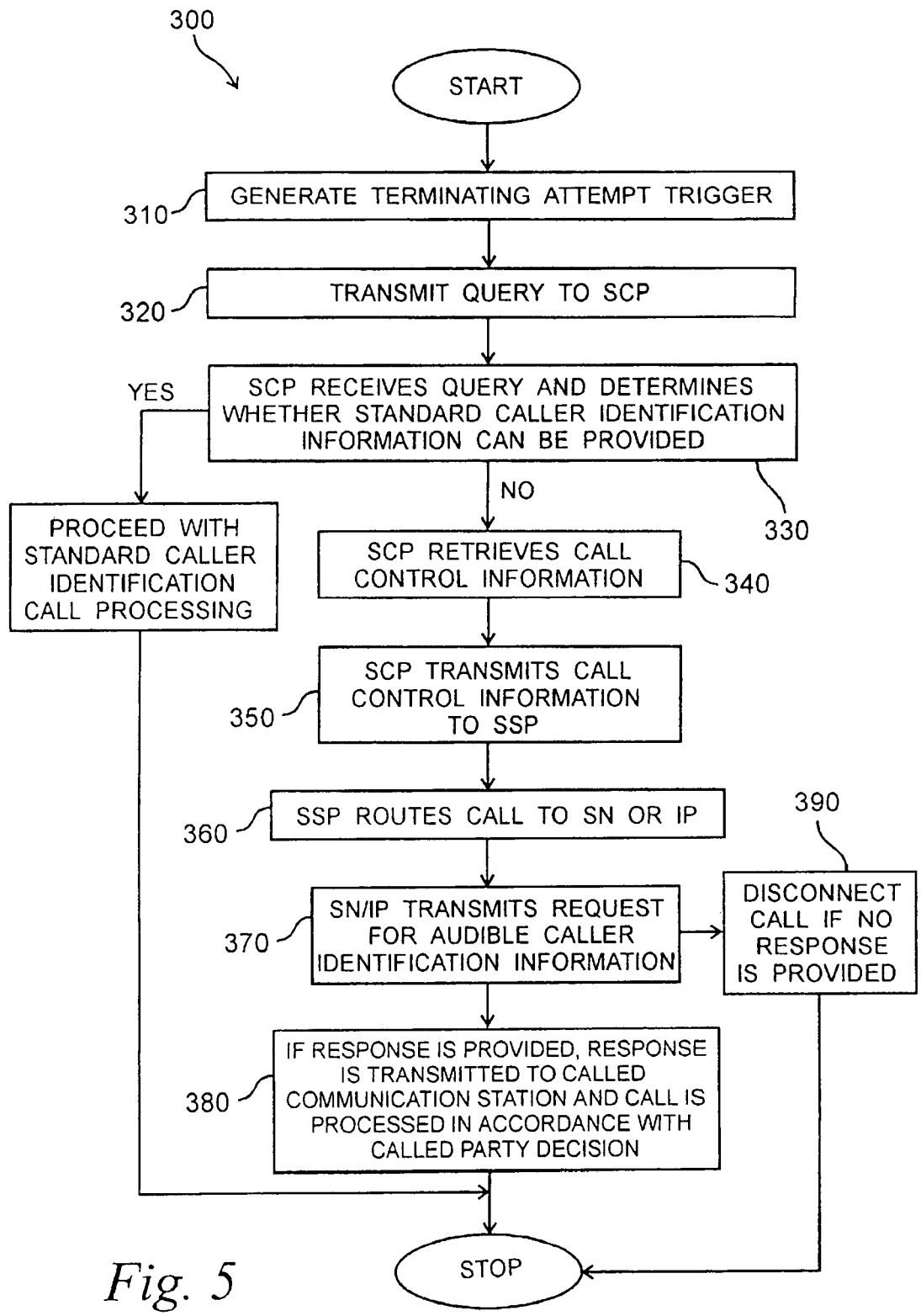
FIG. 5 is a flow chart of a method of a preferred embodiment for providing enhanced caller identification using the system of FIG. 3 or 4.

The systems depicted in FIGS. 3 and 4 can be utilized to implement the method 300 depicted in FIG. 5. For purposes of illustration, assume that a calling party at calling telephone station 262 places a call to a called party at called telephone station 222. In an attempt to connect the call, central office 260 routes the call to SSP 220.

In this embodiment, when the call is routed to SSP 220, a terminating attempt trigger is activated (step 310) when SSP 220 attempts to connect the call to called telephone station 222. The trigger generates a query that is sent to SCP 240 (step 320). The query preferably includes a calling party identification parameter which can include a calling party presentation restriction indicator as known to those skilled in the art and requests the return of standard Caller ID information. The telephone number associated with the calling telephone station 262 is preferably included in the calling party identification parameter of the query as known to those skilled in the art. SCP 240 receives the query and determines whether or not the called party at called telephone station 222 subscribes to the present service. In response to a determination that the called party subscribes to the present service, SCP 240 analyzes the information included with the query to determine whether or not standard Caller ID information can be provided to called telephone station 222 (step 330).

If the standard Caller ID information cannot be provided, SCP 240 accesses database 242 to retrieve call control information (step 340) and returns the call control information to SSP 220 (step 350). The call control information can be sent to SSP 220 in response to a lead directory number that uniquely identifies each SSP as known to those skilled in the art. In response to the call control information, SSP 220 routes the call to SN 250 or IP 290 (step 360). When SN 250 or IP 290 receives the call, SN 250 or IP 290 generates a request for audible caller identification information that is transmitted to the calling telephone station 262 (step 370). The request preferably comprises a statement indicating that the called party doesn't accept calls from unidentified callers and a request for the calling party to speak his/her name. The request preferably comprises an audible message. If the calling party provides an audible response, SN 250 or IP 290 enables the audible response to be transmitted to called telephone station 222 (step 380). Alternatively, if the calling party does not provide the requested information, the call is canceled (step 390).

Figure 6:
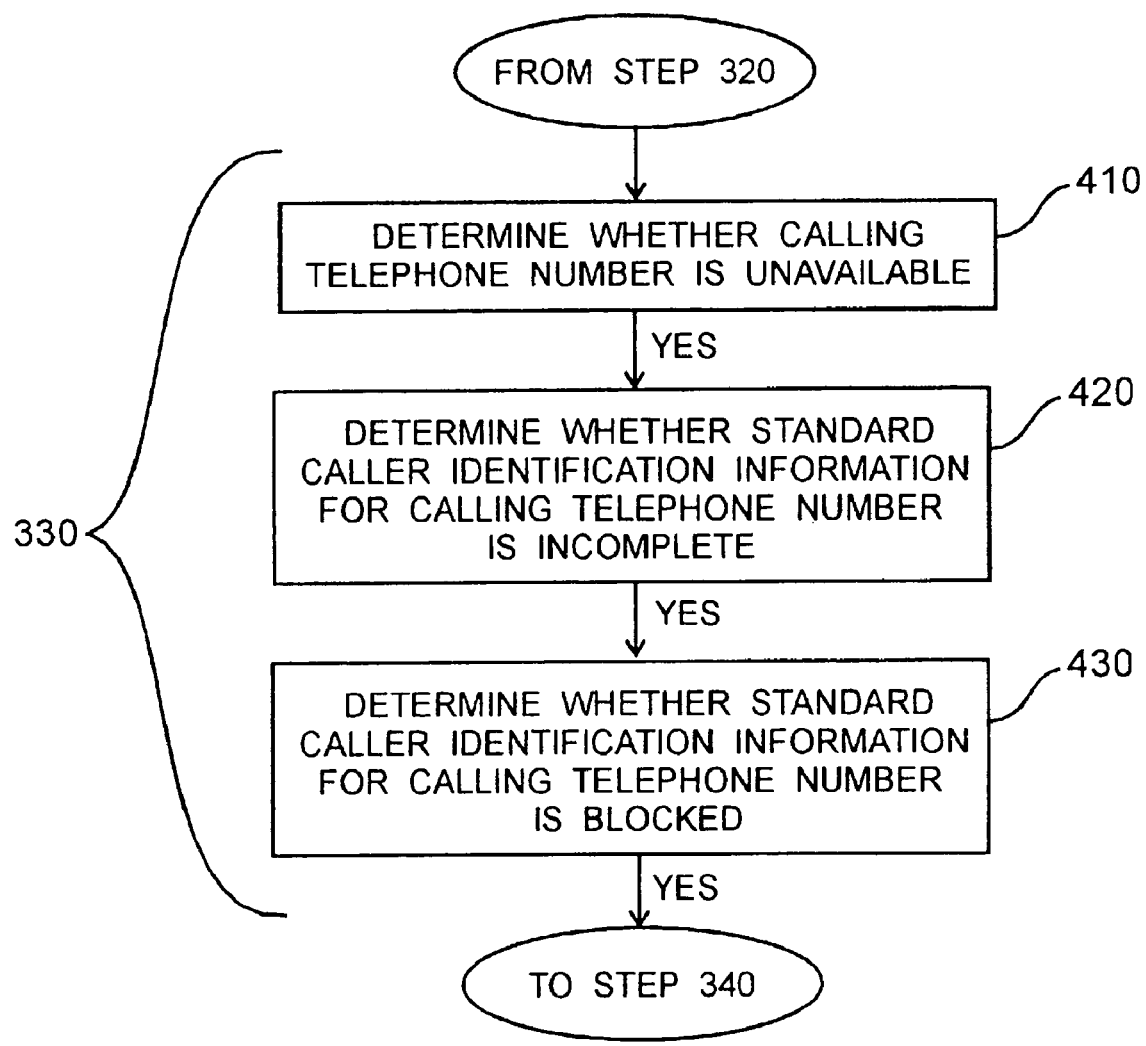
FIG. 6 is a more detailed flow chart of a portion of the method of FIG. 5.

The step of determining whether standard Caller ID information can be provided (step 330, FIG. 5) preferably comprises the steps shown in FIG. 6. The SCP 240 preferably first determines whether standard Caller ID information is unavailable (step 410). The SCP 240 preferably determines whether the standard Caller ID information is unavailable by determining whether or not the calling party identification parameter is present in the query as known to those skilled in the art. In addition, SCP 240 preferably determines whether the standard Caller ID information is incomplete (step 420). SCP 240 preferably determines whether the standard Caller ID information is incomplete by determining whether or not the calling party identification parameter is a valid telephone number as known to those skilled in the art. In addition, SCP 240 preferably determines whether the standard Caller ID information has been blocked (step 430). SCP 240 preferably determines whether the standard Caller ID information has been blocked by determining whether or not the calling party identification presentation restriction indicator is set to "presentation restricted" as known to those skilled in the art.

Figure 7:
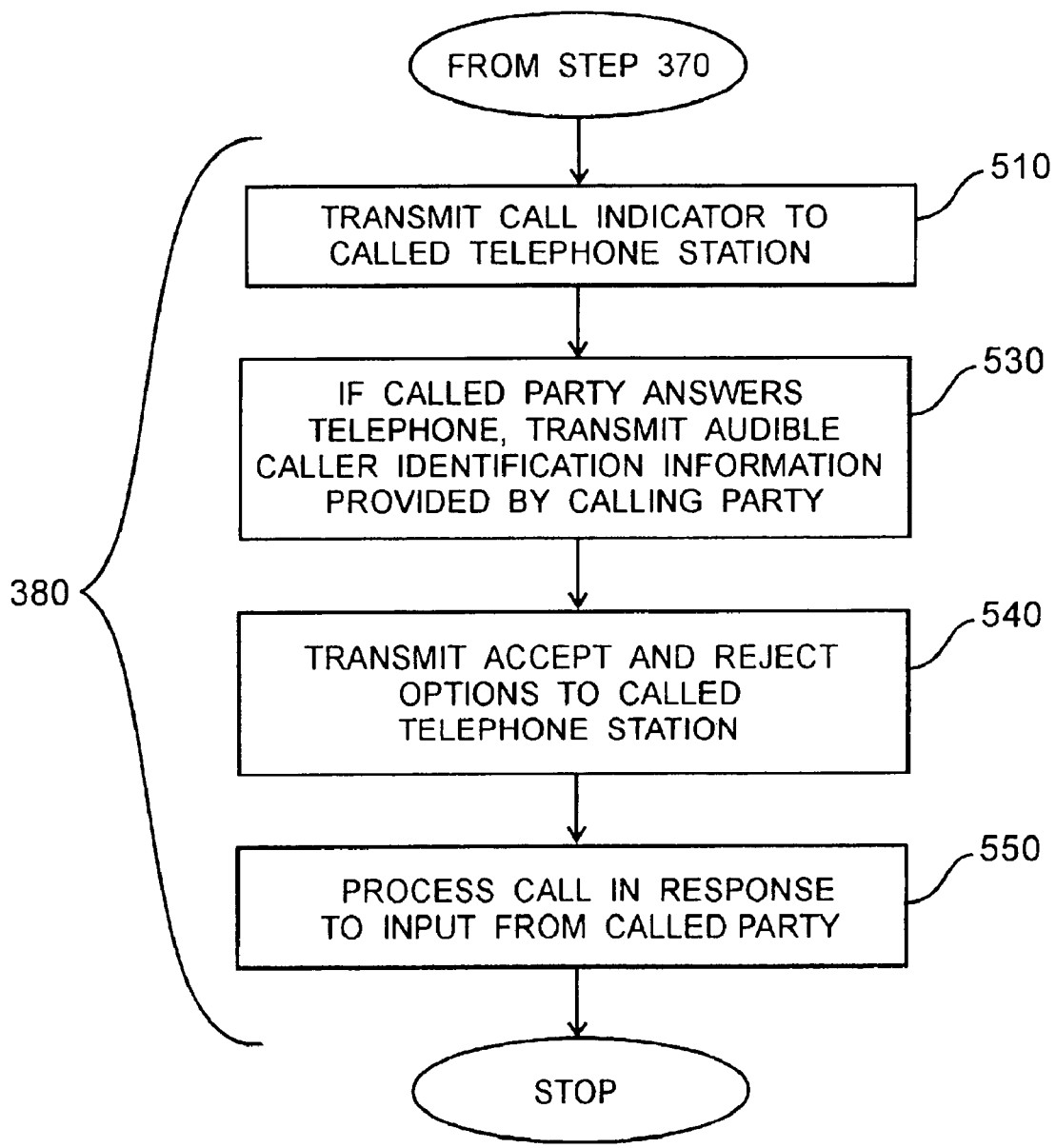
FIG. 7 is a more detailed flow chart of a portion of the method of FIG. 5.

The step of providing the audible caller identification information to the called party (step 380, FIG. 5) preferably comprises the steps shown in FIG. 7. Preferably, called telephone station 222 rings (step 510) to signify that a call has been placed to called telephone station 222. If the called party answers the telephone (i.e. the telephone is off hook), the audible caller identification information that was provided by the calling party is transmitted to called telephone station 222 (step 530). The audible caller identification information is preferably recorded and played back to the called telephone station 222 as known to those skilled in the art. Alternatively, the calling telephone station 262 and the called telephone station 222 can be connected such that the audible caller identification information can be transmitted between the telephone stations 262, 222. After the audible caller identification information has been transmitted, a message is transmitted to called telephone station 222 (step 540). The message preferably includes instructions that allow the called party to accept or reject the call by providing the appropriate input The message preferably comprises audible instructions that are transmitted by SN 250 or IP 290 to called telephone station 222. The accept and reject options preferably comprise, accepting the call by enabling the connection of the call to the called telephone station 222 or canceling the call by disabling the connection of the call to the called telephone station 222. The connection of the call preferably occurs when the called party provides the appropriate input. The input can comprise a suitable signal such as DTMF tones as known to those skilled in the art. The canceling of the call preferably occurs when the called party hangs up the called telephone station 222 (i.e., the telephone station is placed on hook). In response to input provided by the called party, SN 250 or IP 290 can process the call (step 550) by connecting or canceling the call.

The present embodiments provide an efficient and effective method and system for providing caller identification information to a customer when traditional caller identification information is unavailable, incomplete, or blocked.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method of processing a call, the method comprising acts of:
   transmitting a request for audible caller identification information associated with a calling communication station based on an analysis of a query comprising data indicating whether presentation of standard call identification information to a called communication station is restricted; and
   transmitting the audible caller identification information to the called communication station.

2. The method of claim 1, wherein the analysis of a query comprising data indicating whether presentation of standard call identification information to a called communication station is restricted comprises:
   determining whether caller identification information associated with the calling communication station is unavailable.

3. The method of claim 1, wherein the analysis of a query comprising data indicating whether presentation of standard call identification information to a called communication station is restricted comprises:
   determining whether the caller identification information associated with the calling communication station is incomplete.

4. The method of claim 1, wherein the analysis of a query comprising data indicating whether presentation of standard call identification information to a called communication station is restricted comprises:
   determining whether the caller identification information associated with the calling communication station is blocked.

5. The method of claim 1, wherein transmitting a request for audible caller identification comprises:
   requesting for the calling party to speak their name.

6. The method of claim 1, wherein transmitting a request for audible caller identification comprises:
   transmitting a message indicating that the called communication station does not accept calls from an unidentified calling party.

7. The method of claim 1, wherein transmitting the audible caller identification information to the called communication station comprises:
   recording audible caller identification information received from a calling communication station; and
   transmitting the recorded audible caller information to the called communication station.

8. The method of claim 1, further comprising:
   connecting the calling communication station with the called communication station in response to input from the called communication station.

9. The method of claim 1, further comprising:
   canceling the call from the calling communication station in response to input from the called communication station.

10. A computer-readable storage medium comprising a set of instructions for processing a call, the set of instructions to direct a processor to perform acts of:

transmitting a request for audible caller identification information associated with a calling communication station based on an analysis of a query comprising data indicating whether presentation of standard call identification information to a called communication station is restricted; and transmitting the audible caller identification information to the called communication station.

11. The computer-readable storage medium of claim 10, wherein the analysis of a query comprising data indicating whether presentation of standard call identification information to a called communication station is restricted comprises:
    determining whether caller identification information associated with the calling communication station is unavailable.

12. The computer-readable storage medium of claim 10, wherein the analysis of a query comprising data indicating whether presentation of standard call identification information to a called communication station is restricted comprises:
    determining whether the caller identification information associated with the calling communication station is incomplete.

13. The computer-readable storage medium of claim 10, wherein the analysis of a query comprising data indicating whether presentation of standard call identification information to a called communication station is restricted comprises:
    determining whether the caller identification information associated with the calling communication station is blocked.

14. A system for processing a call, the system comprising:
    a network element operative to transmit a request for audible caller identification information associated with a calling communication station based on an analysis of a query comprising data indicating whether presentation of standard call identification information to a called communication station is restricted, and to transmit the audible caller identification information to the called communication station.

15. The system of claim 14, wherein the network element is a service node.

* * * * *